(12) United States Patent
Tsau

(10) Patent No.: US 6,428,302 B1
(45) Date of Patent: Aug. 6, 2002

(54) UNIVERSAL BLOW MOLD ASSEMBLY

(75) Inventor: Tar Tsau, Burlington (CA)

(73) Assignee: Wentworth Mold Inc., Hamilton (CA)

( * ) Notice: Subject to any disclaimer, the term of this patent is extended or adjusted under 35 U.S.C. 154(b) by 2 days.

(21) Appl. No.: 09/662,170

(22) Filed: Sep. 14, 2000

(30) Foreign Application Priority Data

Jul. 14, 2000 (CA) .............................................. 2313881

(51) Int. Cl.$^7$ .............................................. B29C 49/48
(52) U.S. Cl. .................. 425/192 R; 249/102; 249/155; 249/158; 425/195; 425/522
(58) Field of Search ................................ 249/102, 155, 249/158; 425/522, 541, 192 R, 195

(56) References Cited

U.S. PATENT DOCUMENTS

| | | | |
|---|---|---|---|
| 1,317,093 A | * | 9/1919 | Minnick |
| 3,004,285 A | * | 10/1961 | Hagen |
| 3,380,121 A | * | 4/1968 | Chittenden et al. |
| 3,753,641 A | * | 8/1973 | Turner et al. |
| 3,782,879 A | | 1/1974 | Mnilk et al. .................. 425/389 |
| 3,861,640 A | * | 1/1975 | Agneta ......................... 249/102 |
| 4,032,278 A | | 6/1977 | Kuenzig et al. ............. 425/525 |
| 4,151,976 A | * | 5/1979 | Schurman .................... 249/102 |
| RE30,215 E | | 2/1980 | Kuenzig et al. ............. 425/525 |
| 4,427,360 A | | 1/1984 | Albrecht et al. ............. 425/541 |
| 4,762,486 A | | 8/1988 | Windstrup et al. .......... 425/541 |
| 4,815,960 A | * | 3/1989 | Rudolph ...................... 425/522 |
| 4,938,680 A | | 7/1990 | Guarriello et al. .......... 425/522 |
| 5,255,889 A | | 10/1993 | Collette et al. .............. 249/102 |
| 5,326,250 A | | 7/1994 | Doudement .................. 425/541 |
| 5,383,777 A | | 1/1995 | Pace ........................ 425/192 R |
| 5,411,391 A | | 5/1995 | Albrecht et al. ............ 425/451.9 |
| 5,486,103 A | | 1/1996 | Meiring et al. .............. 425/541 |
| 5,599,566 A | | 2/1997 | Casolari ................... 425/405.1 |
| 5,700,496 A | | 12/1997 | Bacon ......................... 425/193 |
| 5,762,981 A | | 6/1998 | Nitsche ....................... 425/526 |
| 5,968,560 A | | 10/1999 | Briere et al. ................. 425/192 |
| 5,993,721 A | | 11/1999 | Kurihara et al. ............. 264/402 |
| 6,099,286 A | | 8/2000 | Nitsche ....................... 425/168 |
| 6,120,279 A | * | 9/2000 | Vovan .................... 425/192 R |
| 6,139,790 A | * | 10/2000 | Bogen et al. ................ 249/102 |

FOREIGN PATENT DOCUMENTS

| | | |
|---|---|---|
| CA | 1153522 | 9/1983 |
| CA | 1214011 | 11/1986 |
| CA | 1238462 | 6/1988 |
| CA | 2139741 | 1/1994 |
| CA | 2143036 | 9/1995 |
| CA | 2082350 | 11/1995 |
| FR | 2659265 | 9/1991 |
| GB | 2 240 300 A * | 7/1991 |
| WO | WO 96/33059 A1 * | 10/1996 |
| WO | WO 97/07965 A1 * | 3/1997 |

* cited by examiner

Primary Examiner—Robert Davis

(57) ABSTRACT

A mold assembly has two mold half shells, corresponding mold half carriers, and a novel intermediate interconnecting member comprising a pair of ring shaped locating members. The locating members have an inner locating wall, preferably a stepped shoulder, that fits into a recessed slot in the outer wall of the mold shells. The locating members have an outer wall that fits into a recessed slot in the inner wall of the mold half carriers. The inner and outer locating walls of the locating members are vertically positioned relative to each to determine the vertical registry of the mold shell to the mold carrier. By utilizing intermediate interconnecting members of differing relative vertical positioning of the inner and outer locating walls, universals mold shells and mold carriers may be used for containers having differing neck heights whereby the neck height adjustment is accommodated by changing the intermediate interconnecting member.

12 Claims, 4 Drawing Sheets

UNIVERSAL BLOW MOLD ASSEMBLY

FIELD OF THE INVENTION

The present invention relates to a universal blow mold assembly having a mold carrier for receiving identical mold shells with different preform neck heights.

BACKGROUND OF THE INVENTION

Typical universal mold assemblies for manufacturing plastic containers include two half mold carriers each adapted to carry one half of a mold shell. Each mold shell half is interchangeable with a corresponding mold carrier to allow for different shaped articles to be manufactured by the mold assembly. The mold assembly includes a pair of support arms each supporting a corresponding carrier. The support arms are connected to a pivot point and act as levers to rotate about the pivot point to open and close the mold halves carried by the support arms through the carriers. Various latching and locking mechanisms have been developed to hold the carriers together during the forming operation. To allow for proper alignment of the mold shell during closure of the mold half carriers, one mold half carrier parting wall usually has bushings which mate with pins extending from the parting wall of the other mold half carrier. Further, the mold shell typically has a recess into which a clamp from the mold carrier is received to hold the mold shell to the carrier.

The universality of the mold carrier, however, is limited to mold shells for containers having the same neck height. This is because the preform blown into the mold shell also carries the neck of the bottle that is normally positioned above the mold carrier. A blow nozzle in the molding equipment is inserted vertically downward a predetermined distance into the neck of the bottle. This predetermined distance is measured relative to the distance from the bottom of the mold assembly, up above the mold assembly to the top of the neck of the preform. While the vertical height of the mold carrier remains constant, the neck height of the bottle may change due to specific market requirements. That is a single bottle shape may have as many as six or more different neck heights each of which is specific to a market. Since the mold shell is secured to the mold carrier at, a predetermined vertical alignment, different mold shells need to be manufactured to locate the shape of the bottle relative to mold shell threaded apertures to accommodate the differing neck heights. Consequently, while the actual shape of the container does not change, different mold shells are required for different neck heights associated with a bottle configuration.

There is a need to develop a universal mold assembly that allows the same mold shell to be used in a mold carrier irrespective of the neck height of the bottle to be blow molded.

SUMMARY OF THE INVENTION

The present invention relates to a mold assembly having two mold half shells and corresponding mold half carriers. The assembly utilizes a novel intermediate interconnecting member preferably comprising a pair of ring shaped locating members. The locating members have an inner locating wall preferably in the form of a stepped shoulder that fits into a recessed slot in the outer wall of the mold shells. The locating members preferably further include an outer wall that fits into a recessed slot in the inner wall of the mold half carriers. The inner and outer locating walls of the locating members are vertically positioned relative to each to determine the vertical registry of the mold shell to the mold carrier.

By utilizing various different intermediate interconnecting members that differ by the relative vertical positioning of the inner and outer locating surfaces, universal mold shells and mold carriers may be used for containers having differing neck heights whereby the neck height adjustment is accommodated by changing the intermediate interconnecting member. As a consequence, quick changes in the assembly can be made by replacing a relatively less expensive interconnecting ring members for each preform neck finish height as compared to utilizing more expensive mold shells. The interconnecting ring members can be kept as part of standard parts for the mold carrier.

The present invention further contemplates utilizing a base insert located below the mold half shells having a base wall that defines the shape of the base of the container. The assembly further includes an interchangeable pedestal spacer plate positioned below the base insert having a thickness chosen relative to the vertical registry defined by the intermediate interconnecting member.

In accordance with one aspect of the present invention there is provided a mold assembly comprising two mold half shells having first inner walls defining a cavity whose shape corresponds to side walls of a container to be formed in the assembly. The mold half shells have a first outer wall. The assembly comprises two mold half carriers each releasably supporting a corresponding one of the mold half shells. The two mold half carriers are moveable between an open position allowing access to the mold half shells and a closed position for formation of a container within the cavity. The mold half carriers have a second inner wall corresponding to the first outer wall of the mold half shells when the mold half carrier supports the mold half shell. The assembly further includes an intermediate interconnecting member for securing in vertical registry each mold half shell with the corresponding mold half carrier. The intermediate interconnecting member comprises an outside connecting surface adapted to secure the intermediate interconnecting member to the second inner wall of the mold half carrier and comprises an inside connecting surface adapted to secure the intermediate interconnecting member to the first outer wall of the mold half shell. The inside and outside connecting surfaces of the intermediate interconnecting member are vertically spaced relative to each other to define vertical registry between the mold half shell and the corresponding mold half carrier.

BRIEF DESCRIPTION OF THE DRAWINGS

For a better understanding of the nature and objects of the present invention reference may be had by way of example to the accompanying diagrammatic drawings, in which.

DETAILED DESCRIPTION OF THE PREFERRED EMBODIMENTS

Figure 1:
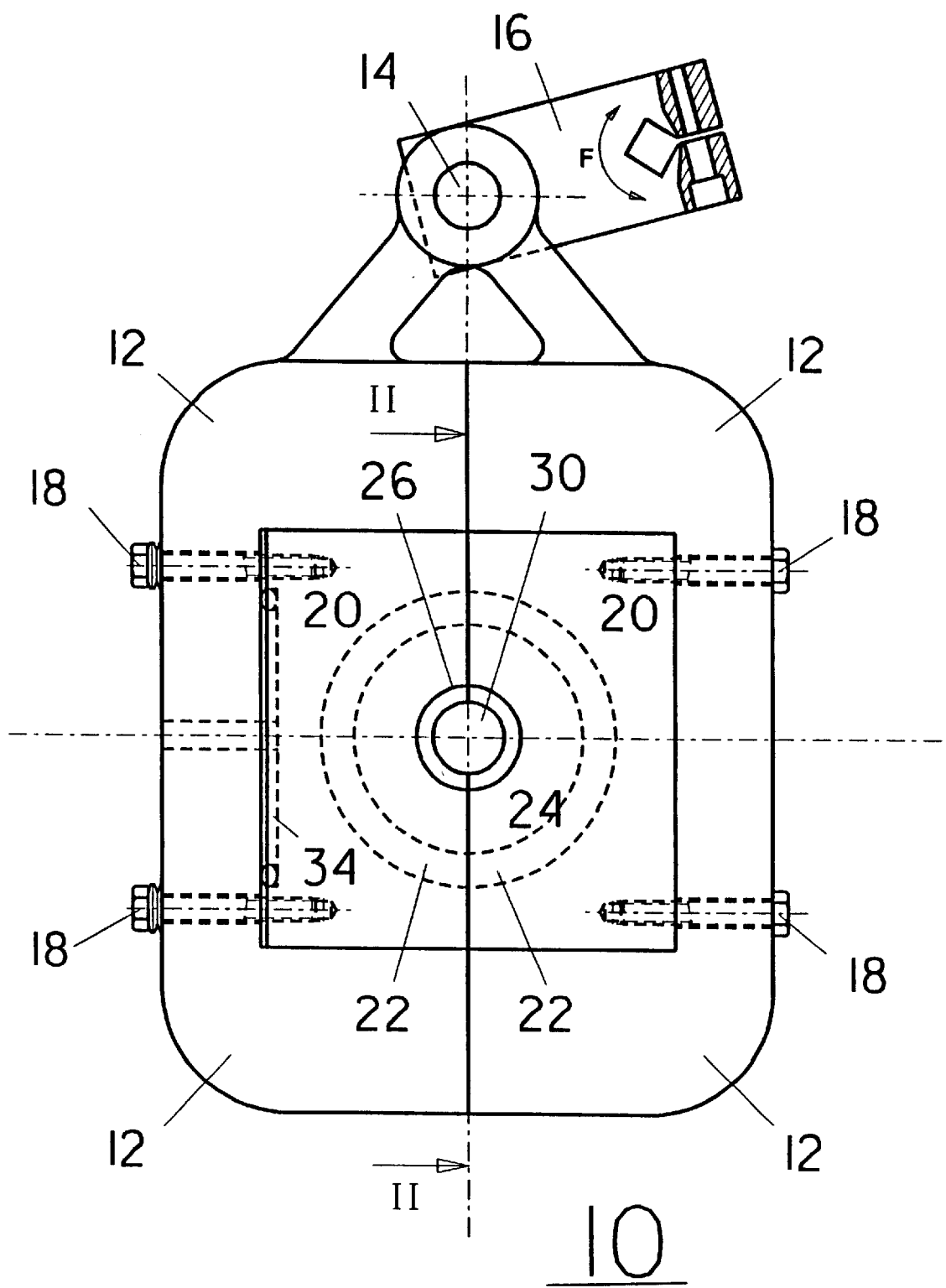
FIG. 1 is plan view of the mold assembly.
Figure 2:
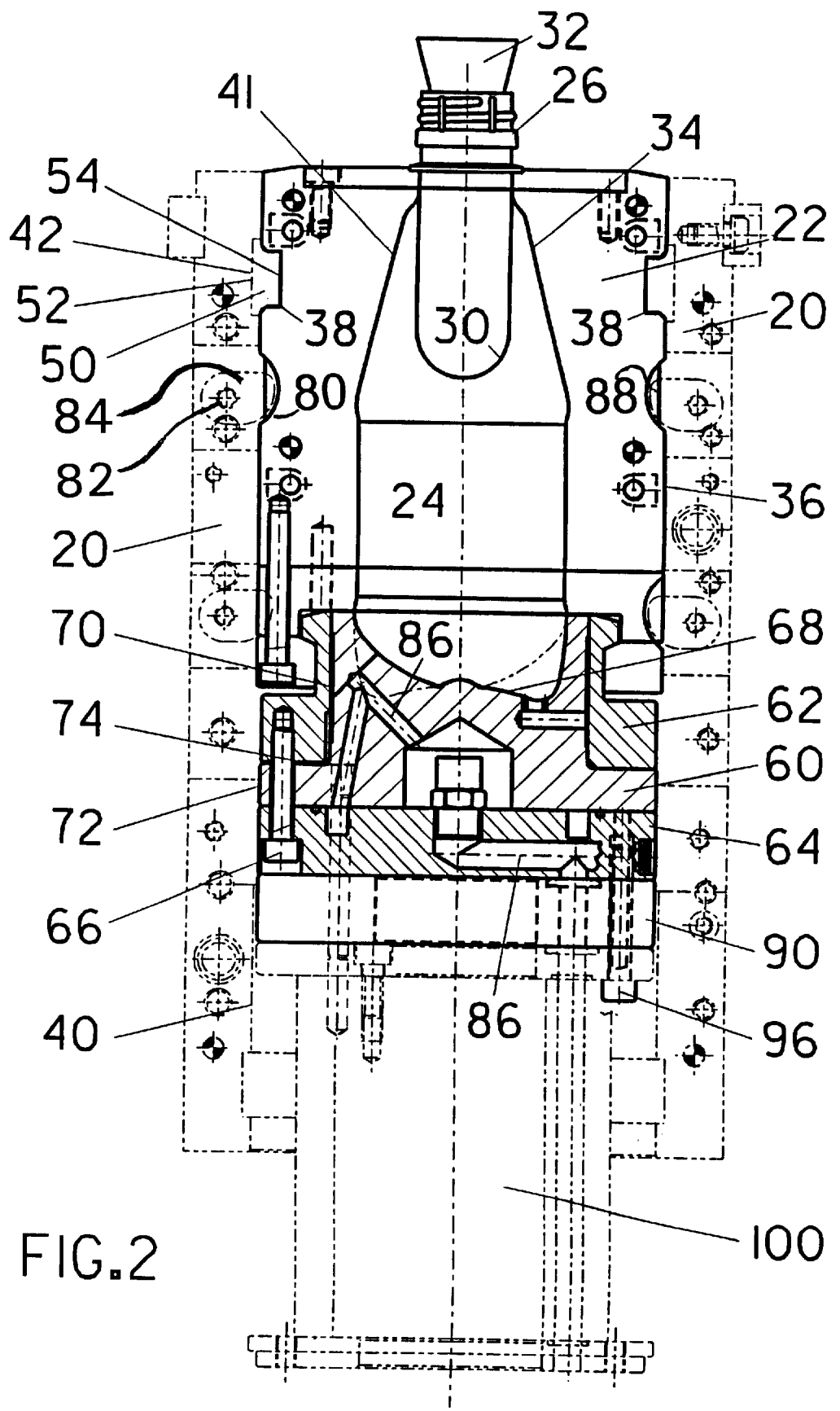
FIG. 2 is a side sectional view of the mold assembly as seen at lines II—II of FIG. 1.

Referring to the drawings the preferred embodiment of the present invention is described. In FIGS. 1 and 2, the mold assembly 10 includes a pair of support arms 12 which pivot about pivot pin or axis 14. A lever arm 16 causes the support arms 12 to pivot about axis 14 to move the support arms 12 into the closed position shown. The support arms 12 support, through threaded bolts 18 two mold half carriers 20. The mold half carriers 20 each carry one sidewall half of a mold shell 22. In the closed position shown, mold shells 22 define a cavity 24 whose shape determines the shape of the container formed in the cavity 24. During container formation, the support arms 12 hold the mold half carriers 20 and shells 22 in the closed position shown. Pressurized air is blown by nozzle 32 into neck 26 of preform 30 to expand preform 30 into the cavity 24. Later in the formation, the support arms 12 are pivoted about axis 14 to separate the carriers 20 and shells 22 to permit removal of the formed container.

Referring to FIG. 2, the two mold half shells 22 have first inner walls 34 which define the cavity 24 whose shape corresponds to side walls of the container to be formed in the assembly 10. The mold half shells have first outer walls 36. A first recessed slot 38 extends horizontally about the outer wall 36. The recessed slot 38 is located vertically adjacent the tapering neck portion 41 of the container formed in the cavity 24.

The two mold half carriers 20 each include an inner wall 40 that abuts the outer wall 36 of the mold half shell 22. The inner wall 40 of the mold half carrier 20 has a recessed slot 42 that extends horizontally about the surface wall 40 of the carrier 20. The drawing shows the wall or the recessed slot 42 located substantially relative vertically adjacent to the recessed slot 38 of the mold half shell 22.

Figure 3:
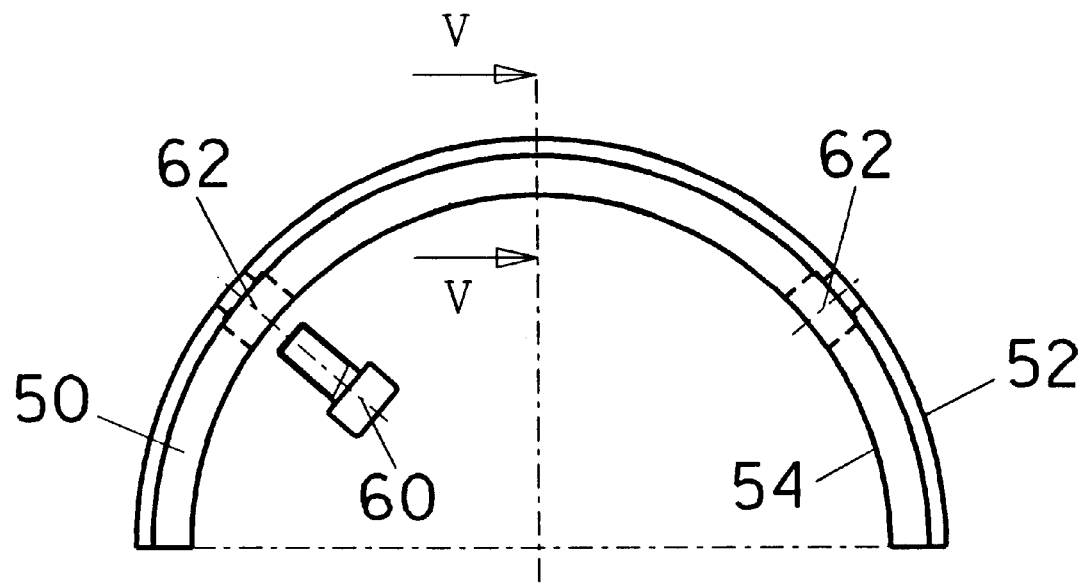
FIG. 3 is a plan view of the intermediate connecting member of the present invention.
Figure 4:
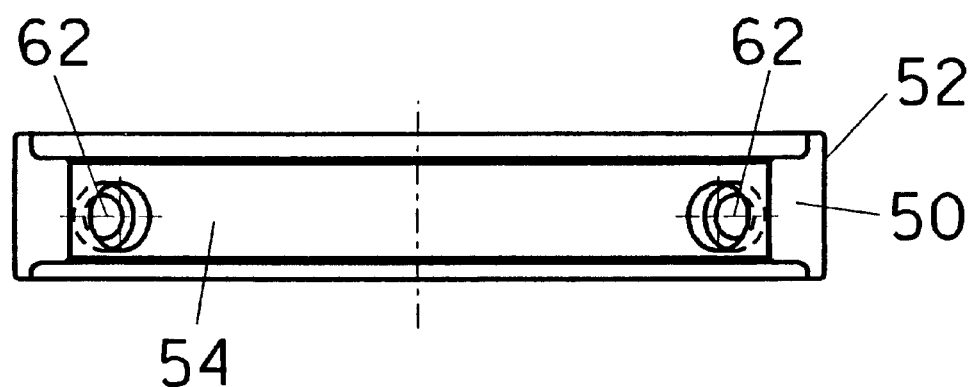
FIG. 4 is an end view of the intermediate connecting member of the present invention; and, FIGS. 5A, 5B, and 5C are side sectional views of various intermediate connecting members of the present invention taken along line V—V of FIG. 3.
Figure 5A:
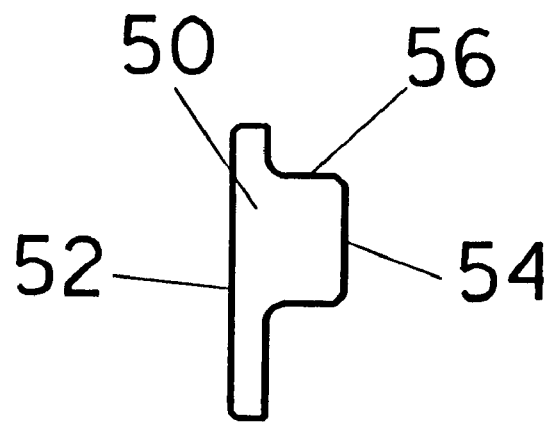
Figure 5B:
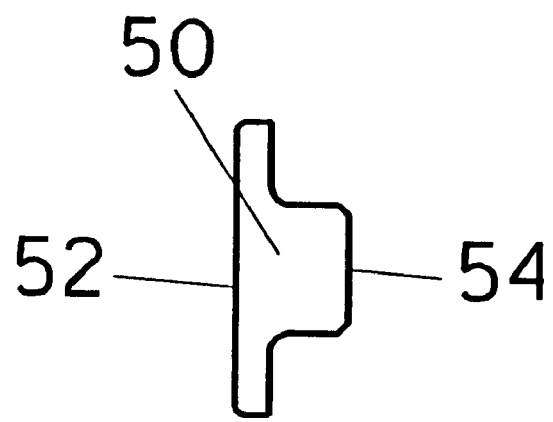
Figure 5C:
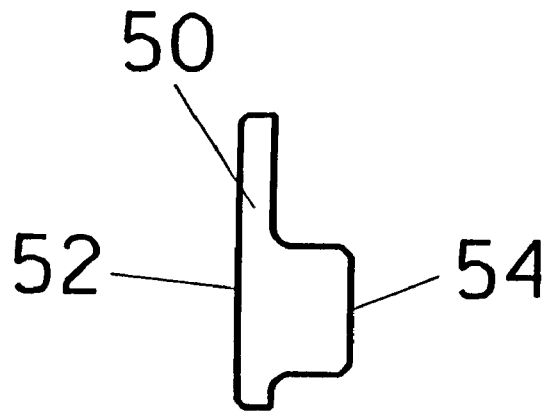

In accordance with the present invention, a pair of intermediate interconnecting locating members 50 are shown in FIGS. 2, 3, 4 and 5a through 5c for securing in vertical registry each mold half carrier 20 relative to each mold half shell 22. The locator members 50 have a first outer surface 52 which is keyed to fit within the slot 42 of the mold half carrier 20. The intermediate interconnecting locating member 50 further includes an inner keyed surface 54 which has a shoulder 56 that rests within the recess slot 38 of the mold shell member 22. As shown in FIG. 3, mounting screws 60 are adapted to pass through openings 62 in the ring or intermediate interconnecting member 50 to permit the member 50 to be secured relative to the mold carrier 20. The securing of the interconnecting member 50 to the mold shell 22 in the slot 38 of the mold shell 22 is close fit. It is not an interference fit nor is it a loose fit. In this manner, the mold shell 22 is readily removed from the ring or interconnecting member 50 during operation and the interconnecting member 50 may be unscrewed or released from the slot 42 of the mold carrier 20 and replaced with another mold carrier interconnecting member 50 as shown in FIGS. 5a through 5c.

In FIGS. 5a through 5c it is noted that the relative vertical positioning of the inner keyed surface 54 of the interconnecting member 50 varies vertically relative to the outer keyed surface 52 of the inner connecting member 50. Thus, by simply changing the locator member 50 in the mold assembly 10, the relative vertical positioning of the mold shell 22 to the mold carrier 20 accommodates for differences in the neck height 26 associated with the preformed bottle or container to be formed within the cavity 24 of the mold shell 22.

The mold shell 22 further includes two vertically spaced apart curved recesses' 80 along each side of the shell 22 shown in FIG. 2. The mold carrier 20 has corresponding clamping plates 84 pivotally attached by securing screws 82 to the mold carrier 20 for each curved recess 80. The plate members 84 each have a cam surface 88 and are each adapted to rotate about a corresponding pin 82 bringing the cam surface 88 into engagement with the curved recess 80 to secure the mold shell 22 to the mold carrier 20.

The mold assembly further includes a base insert 60 that rests directly on top of the adapter 64. The base insert 60 includes an upper wall 68 contoured to the shape of a base of the container to be formed. In this embodiment, the base insert upper wall 68 is commonly referred to as a "cavity insert". The base insert has upper and lower annular side wall portions 70 and 72 respectively. The lower annular side wall portion 72 is closer to the adapter than the upper annular side wall portion 74. The lower annular side wall portion 72 has a larger diameter than the upper annular side wall portion 74 such that the lower annular side wall portion 70 has a stepped out peripheral flange 74 upon which the wear ring 62 is positioned such that the wear ring 62 surrounds and engages the upper annular side wall portion 70.

The threaded fasteners 66 pass through threaded apertures in the adapter 64 and flange part 74, or shoulder 74, of the base insert 60 and into the wear ring 62 to secure the adapter 64, the base insert 60 and the wear ring 62 together with the peripheral flange 74 of the base insert 60 sandwiched between the wear ring 62 and the adapter 64.

The wear ring 62 is a hardened steel ring that is slip fitted around upper annular side wall portion 70 base insert 60.

The adapter 64 and the base insert 60 are provided with cooling passages 86 though which coolant flows during the cool down cycle of the formation of the container in cavity 24.

Beneath the adapter 64 is a spacer plate 90. The thickness or vertical height of spacer plate 90 is chosen relative to the vertical offset displacement between keyed surfaces 52 and 54 of interconnecting ring members 50. This permits for accurate seating of mold assembly 10 on pedestal 100. The spacer 90 is readily interchanged when the intermediate connecting ring members 50 are interchanged. The spacer 90 is secured by threaded fasteners 96 to the adapter 66 of the base insert 60. The nominal size of the spacer plate may vary in thickness relative to the intermediate interconnecting member 50.

What is claimed is:

1. A mold assembly comprising:
two mold half shells having first inner walls defining a cavity whose shape corresponds to side walls of a container to be formed in the assembly, the mold half shells having a first outer wall;
two mold half carriers each releasably supporting a corresponding one of the mold half shells, the two mold half carriers being moveable between an open position allowing access to the mold half shells and a closed position for formation of a container within the cavity, the mold half carriers having a second inner wall corresponding to the first outer wall of the mold half shells when the mold half carrier supports the mold half shell; and,
an intermediate interconnecting member for securing in vertical registry each mold half shell with the corresponding mold half carrier, the intermediate interconnecting member comprising an outside connecting surface adapted to secure the intermediate interconnecting member to the second inner wall of the mold half carrier and comprising an inside connecting surface adapted to secure the intermediate interconnecting member to the first outer wall of the mold half shell, the inside and outside connecting surfaces of the intermediate interconnecting member being vertically spaced relative to each other to define vertical registry between the mold half shell and the corresponding mold half carrier.

2. A mold assembly comprising:
two mold half shells having first inner walls defining a cavity whose shape corresponds to side walls of a container to be formed in the assembly, the mold half shells having a first outer wall;
two mold half carriers each releasably supporting a corresponding one of the mold half shells, the two mold half carriers being moveable between an open position allowing access to the mold half shells and a closed position for formation of a container within the cavity, the mold half carriers having a second inner wall corresponding to the first outer wall of the mold half shells when the mold half carrier supports the mold half shell;
an intermediate interconnecting member for securing in vertical registry each mold half shell with the corresponding mold half carrier, the intermediate interconnecting member comprising an outside connecting surface adapted to secure the intermediate interconnecting member to the second inner wall of the mold half carrier and comprising an inside connecting surface adapted to secure the intermediate interconnecting member to the first outer wall of the mold half shell, the inside and outside connecting surfaces of the intermediate interconnecting member being vertically spaced relative to each other to define vertical registry between the mold half shell and the corresponding mold half carrier; and,
a base insert located below the mold half shells having a base wall that defines the shape of the base of the container, and an interchangeable pedestal spacer positioned below the base insert having a vertical thickness chosen relative to the vertical registry defined by the intermediate interconnecting member.

3. The mold assembly of claim 1 wherein the first outer wall of the mold half shell abuts the second inner wall of the mold half carrier other than at the intermediate interconnecting member.

4. The mold assembly of claim 1 wherein the first outer wall of the mold half shells includes a first recessed slot adapted to receive the inside connecting surface of the intermediate interconnecting member.

5. The mold assembly of claim 4 wherein the second inner wall of the mold half carriers has a second recessed slot adapted to receive the outside connecting surface of the intermediate interconnecting member.

6. A mold assembly comprising:
two mold half shells having first inner walls defining a cavity whose shape corresponds to side walls of a container to be formed in the assembly, the mold half shells having a first outer wall;
two mold half carriers each releasably supporting a corresponding one of the mold half shells, the two mold half carriers being moveable between an open position allowing access to the mold half shells and a closed position for formation of a container within the cavity, the mold half carriers having a second inner wall corresponding to the first outer wall of the mold half shells when the mold half carrier supports the mold half shell;
an intermediate interconnecting member for securing in vertical registry each mold half shell with the corresponding mold half carrier, the intermediate interconnecting member comprising an outside connecting surface adapted to secure the intermediate interconnecting member to the second inner wall of the mold half carrier and comprising an inside connecting surface adapted to secure the intermediate interconnecting member to the first outer wall of the mold half shell, the inside and outside connecting surfaces of the intermediate interconnecting member being vertically spaced relative to each other to define vertical registry between the mold half shell and the corresponding mold half carrier; and,
wherein the second inner wall of the mold half carriers has a second recessed slot adapted to receive the outside connecting surface of the intermediate interconnecting member.

7. The mold assembly of claim 2 wherein the first outer wall of the mold half shell abuts the second inner wall of the mold half carrier other than at the intermediate interconnecting member.

8. The mold assembly of claim 2 wherein the first outer wall of the mold half shells includes a first recessed slot adapted to receive the inside connecting surface of the intermediate interconnecting member.

9. The mold assembly of claim 8 wherein the second inner wall of the mold half carriers has a second recessed slot adapted to receive the outside connecting surface of the intermediate interconnecting member.

10. The mold assembly of claim 2 wherein the second inner wall of the mold half carriers has a second recessed slot adapted to receive the outside connecting surface of the intermediate interconnecting member.

11. A mold assembly comprising:
two mold half shells having first inner walls defining a cavity whose shape corresponds to side walls of a container to be formed in the assembly, the mold half shells having a first outer wall including a first recessed slot extending horizontally around the two mold half shells;
two mold half carriers each releasably supporting a corresponding one of the mold half shells, the two mold half carriers being moveable between an open position allowing access to the mold half shells and a closed position for formation of a container within the cavity, the mold half carriers having an inner wall that abuts the first outer wall of the mold half shells, the second inner wall of the mold half carriers having a second recessed slot extending horizontally around the second inner wall; and,
a pair of intermediate interconnecting locating members for securing in vertical registry each mold half carrier to a corresponding mold half shell, said locator members having an outer keyed surface mating with the second recessed slot of the mold half carriers and an inner keyed surface mating with the first recessed slot of the first outer wall of the mold half shells, and the inner and outer keyed surfaces having a relative vertical displacement that defines vertical registry between the mold half shells and the mold half carriers.

12. A mold assembly comprising:
two mold half shells having first inner walls defining a cavity whose shape corresponds to side walls of a container to be formed in the assembly, the mold half shells having a first outer wall including a first recessed slot extending horizontally around the two mold half shells;

two mold half carriers each releasably supporting a corresponding one of the mold half shells, the two mold half carriers being moveable between an open position allowing access to the mold half shells and a closed position for formation of a container within the cavity, the mold half carriers having an inner wall that abuts the first outer wall of the mold half shells, the second inner wall of the mold half carriers having a second recessed slot extending horizontally around the second inner wall;

a pair of intermediate interconnecting locating member for securing in vertical registry each mold half carrier to a corresponding mold half shell, said locator members having an outer keyed surface mating with the second recessed slot or the mold half carriers and an inner keyed surface mating with the first recessed slot of the first outer wall of the mold half shells, and the inner and outer keyed surfaces having a relative vertical displacement that defines vertical registry between the mold half shells and the mold half carriers; and, a base insert located below the mold shell having an inner base wall that defines the shape of the base of the container, and an interchangeable pedestal spacer positioned below the base insert having a vertical thickness chosen relative to the vertical registry defined by the locating members.

* * * * *